July 21, 1936. E. M. TUCKER 2,048,234
ROOFING NAIL
Filed May 22, 1935
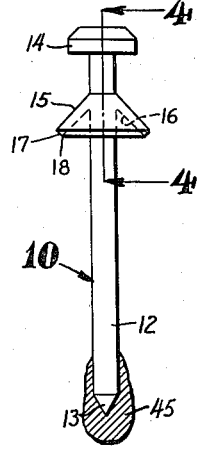
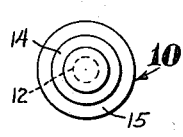
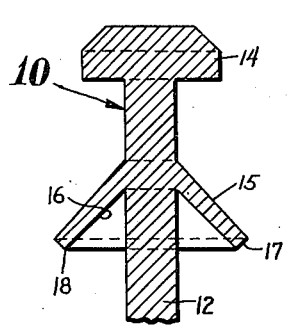
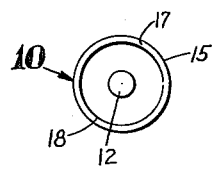
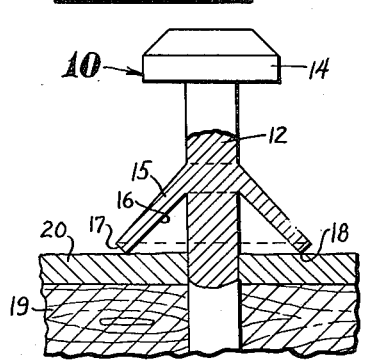
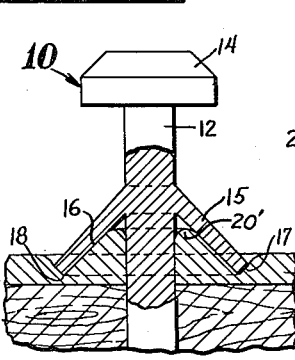
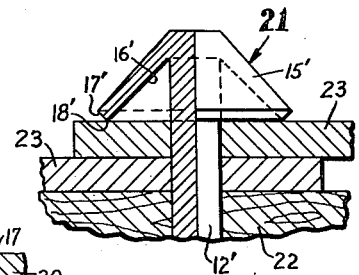
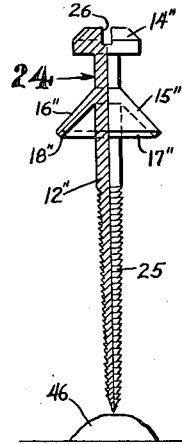
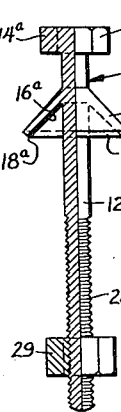
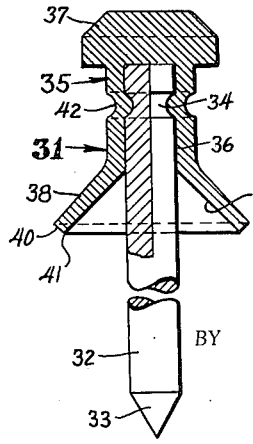
INVENTOR.
EDGAR M. TUCKER
BY
ATTORNEY.

Patented July 21, 1936

2,048,234

UNITED STATES PATENT OFFICE 2,048,234

ROOFING NAIL

Edgar M. Tucker, South Pasadena, Calif.

Application May 22, 1935, Serial No. 22,741

2 Claims. (Cl. 106—33)

This invention relates to improvements in roofing nails.

The general object of the invention is to provide a securing device such as a nail or screw which includes novel means for sealing around the shank thereof adjacent the point where it enters the article into which it is driven.

A further object of the invention is to provide a securing device including a shank having a novel frustro-conical skirt thereon which when the device is driven through plastic material forces the material up into the skirt around the shank and causes the material within the skirt to raise above the surface of the material exterior to the skirt.

Other objects and the advantages of my invention will be apparent from the following description taken in connection with the accompanying drawing wherein:

Fig. 1 is a side elevation of my improved nail.

Fig. 2 is a top plane view of the nail shown in Fig. 1.

Fig. 3 is a bottom plane view of the nail.

Fig. 4 is an enlarged fragmentary section taken on line 4—4 of Fig. 1.

Fig. 5 is an enlarged fragmentary view of the nail shown in Fig. 1, partly in section, showing the nail being driven through a layer of composition roof coating and into the roof deck.

Fig. 6 is a view similar to Fig. 5 showing the nail fully driven home.

Fig. 7 is a view similar to Fig. 5 showing a slightly modified form of my invention and showing the nail being driven through composition shingles into a roof deck.

Fig. 8 is a view similar to Fig. 7 showing the nail fully driven home.

Fig. 9 is a view similar to Fig. 1 showing the invention in the form of a log screw.

Fig. 10 is a view similar to Fig. 1 showing the invention in the form of a bolt, and Fig. 11 is a side view, partly in section, of another modified form of my invention.

Referring to the drawing by reference characters I have indicated my improved securing device generally at 10. As shown the device 10 includes a shank 12 which is pointed at one end as at 13 and has an integral enlarged head 14 thereon at the opposite end. Spaced from the head 14 the device includes a frustro-conical skirt 15 which is integral with shank 12 and is positioned with the base of the cone towards the point 13. The skirt 15 includes an inner surface 16 which converges towards the head 14 and the base surface 17 is inclined convergently towards the shank to form a sharp lower edge 18.

In Figs. 5 and 6 I have shown the device 10 as used as a tile nail for fastening a tile holding wire thereto. In these figures I have indicated a wood roof deck at 19 and a plastic composition roof coating material at 20. In Fig. 5 the nail 10 is shown as driven into the roof deck 19 until the edge 18 of the skirt 15 barely engages the coating 20. As the nail 10 is driven further into the deck the skirt edge 18 bites into the composition coating 20 and the inclined surface 16 of the skirt compresses the composition material 20 within the skirt and forces it tightly against the shank 12 and also causes the plastic coating to flow upward until when the nail is fully driven home as shown in Fig. 6 the composition material within the skirt 15 has been forced upward above the surface of the composition material exterior to the skirt 15. Thus a very secure water tight seal is formed around the shank 12 of the nail. The material at 20' is higher than the top of the plastic and even if the nail is slightly withdrawn water cannot seep around the nail into the roof.

In Figs. 7 and 8 I have indicated a slightly modified form of my invention generally at 21. The nail 21 is primarily for securing composition shingles to a roof deck and is similar to the nail 10 except that the shank portion above the skirt and the head is omitted. Portions of the device 21 similar to the device 10 have been indicated by similarly primed reference numerals.

In Figs. 7 and 8 I have shown a wood roof deck at 22 and overlapping composition shingles at 23. In Fig. 7 the nail 21 is shown as driven into the roof deck 22 until the edge 18' of the skirt 15' barely engages the upper surface of the top shingle. As the nail 21 is driven further into the roof deck the skirt edge 18' bites into the top shingle and the inclined surface 16' of the skirt compresses the portion of the composition shingle within the skirt and forces it tightly against the shank 12' and upward. When it is fully driven home as shown in Fig. 8 the portion of the shingle within the skirt 15' has been forced upward above the surface of the portion of the shingle exterior to the skirt 15' thus forming a water tight seal around the shank 12'.

In Fig. 9 I have indicated a securing device generally at 24 which is similar to the nail 10 and similar portions thereof are indicated by similarly double primed reference numerals. In the device 24 a portion of the shank 12" is tapered and is provided with threading 25 and the head 14" has a slot 26 therein.

In Fig. 10 I have indicated a securing device generally at 27 which is similar to the device 10 and similar portions thereof are indicated by similarly "a" primed reference numerals. In the device 27 a portion of the shank 12a is provided with threading 28 to receive a nut 29 and the head 14a is formed hexagonal as a bolt head as indicated at 30.

In Fig. 11 I have indicated a modified form of securing device generally at 31. As shown the device 31 includes a shank 32 which is pointed at one end as at 33 and adjacent the opposite end has an annular groove 34 therein. Positioned on the shank 32 I provide a cap member 35 which has a recess 36 therein in which the shank 32 is positioned.

The cap 35 includes an enlarged head portion 37 and a frustro-conical skirt portion 38 which is positioned with the base of the cone towards the shank point 33. The skirt 38 is formed similar to the previously described skirt 15 and includes an inner surface 39 which converges towards the head 34 and the base surface 40 is inclined convergently towards the shank point to form a sharp lower edge 41. After the cap 35 is positioned on the shank 32 the material thereof is swedged into the shank groove 34 as indicated at 42. The shank 32 may be formed as a log screw similar to the device 24 or as a bolt similar to the device 27.

In use the device 31 functions in the same manner as previously described in connection with the device 10.

Where the device is used on a roof not having plastic material thereon the lower end of the shank of the device may be dipped in a container having plastic material therein such as a composition comprising asbestos fibers, slate dust, petroleum thinner and liquid asphalt. When the device is extracted from the plastic material, some of the material adheres to the shank of the device as indicated at 45 in Fig. 1. Thereafter when the device is driven into the roof the material 45 remains on the roof surface and is forced up into the conical skirt of the device to form a water tight seal around the shank of the device.

Instead of dipping the shank of the device into plastic material a mound thereof may be placed at the position where the device is to go into the roof as indicated at 46 in Fig. 9. The shank of the device then passes through the plastic material and when skirt portion of the device engages the plastic material it is forced up into the skirt to form a fluid tight seal around the shank of the device.

From the foregoing description it will be apparent that I have provided a novel securing device which is simple in construction and highly efficient in use.

Having thus described my invention, I claim:

1. The combination of a surface having a flexible material on its outer face and a nail, said nail including a shank portion and a frusto-conical, rigid imperforate skirt portion integral with said shank, said skirt portion having a sharpened lower edge, said skirt portion being downwardly directed and having its lower edge constructed and arranged to be driven into the flexible material of said outer face, and to form a depression therein encircling the lower edge of the skirt, the rigidity of said skirt maintaining the skirt undistorted, said flexible material entering said skirt and being forced convergently upwardly within the skirt to a location above the normal surface of the flexible material to form an upwardly projecting bead which surrounds the shank within the skirt, said flexible material within the skirt engaging the lower portion of the inner wall of the skirt to form a seal against the inner wall.

2. In a nail for use in securing flexible material upon the outer surface of a roof, a shank portion having a sharpened end and having an integral frusto-conical, imperforate skirt portion of rigid material projecting outwardly therefrom and directed towards said sharpened end, said skirt portion having a sharpened lower edge whereby when the nail is driven into flexible material with the rigid skirt entering the material, the flexible material will be forced up into the skirt to form a seal.

EDGAR M. TUCKER.